United States Patent
Stumer et al.

(10) Patent No.: US 7,492,887 B1
(45) Date of Patent: Feb. 17, 2009

(54) NETWORK GROUP PICKUP

(75) Inventors: Peggy M. Stumer, Boca Raton, FL (US); Dennis Lee Kucmerowski, Delray Beach, FL (US); David A. Vander Meiden, Boca Raton, FL (US)

(73) Assignee: Siemens Communications, Boca Raton, FL (US)

( * ) Notice: Subject to any disclaimer, the term of this patent is extended or adjusted under 35 U.S.C. 154(b) by 0 days.

(21) Appl. No.: 09/218,783

(22) Filed: Dec. 22, 1998

(51) Int. Cl.
*H04M 3/00* (2006.01)
*H04M 5/00* (2006.01)
*H04M 3/42* (2006.01)

(52) U.S. Cl. .................... 379/265.01; 379/207.12; 379/212.01; 379/220.01; 379/265.09; 379/273

(58) Field of Classification Search ............ 379/265.09, 379/220.01, 266.01, 265.01, 201.02, 265.02, 379/88.25, 350, 225, 266.04, 165, 221.01, 379/214.01, 212.01, 207.12, 273; 370/352, 370/360; 709/202; 455/411, 518, 519
See application file for complete search history.

(56) References Cited

U.S. PATENT DOCUMENTS

| | | | | |
|---|---|---|---|---|
| 3,737,587 | A * | 6/1973 | Romero ................. | 379/214.01 |
| 4,603,236 | A | 7/1986 | Smith et al. | |
| 4,614,842 | A | 9/1986 | Smith et al. | |
| 5,200,996 | A * | 4/1993 | Beierle .................. | 379/214.01 |
| 5,247,670 | A | 9/1993 | Matsunaga | |
| 5,506,890 | A * | 4/1996 | Gupta et al. ............ | 379/88.25 |
| 5,521,970 | A * | 5/1996 | Herrick et al. ......... | 379/221.01 |
| 5,579,380 | A | 11/1996 | Ferguson et al. ......... | 379/165 |
| 5,768,360 | A * | 6/1998 | Reynolds et al. ....... | 379/220.01 |
| 5,809,130 | A * | 9/1998 | Ayala .................... | 379/266.01 |
| 5,940,496 | A * | 8/1999 | Gisby et al. ............ | 379/265.02 |
| 6,188,761 | B1 * | 2/2001 | Dickerman et al. ..... | 379/265.09 |
| 6,192,123 | B1 * | 2/2001 | Grunsted et al. ............ | 379/350 |
| 6,195,560 | B1 * | 2/2001 | Chavez, Jr. ................. | 455/518 |

(Continued)

FOREIGN PATENT DOCUMENTS

DE 196 23 332 12/1997

(Continued)

*Primary Examiner*—Thjuan K Addy (57) ABSTRACT

A system and apparatus for enabling supplementary service functions, such as group pickup, to be implemented in a communication network having one or more local servers. The group pickup system is adapted to enable one group member to automatically receive or manually pick up another group member's call from anywhere within the network, including outside the local server in a multiserver network. The group pickup system includes an automatic mode unit for enabling the system to pro-actively seek a group member to take a call and a manual mode unit for enabling the system to search for an alerting group member. The system further includes a local connect unit and a remote connect unit to establish local or remote connections to a group member, respectively. A remote search unit enables the system to request a remote search. A queue/dequeue unit is provided for selecting a group member from a group list. A call establishing unit is provided for establishing a connection between the call and the group member and an answer unit is provided to complete the connection. A notification unit may be provided to notify the system of the completed connection. A release links unit may also be provided to release any temporary links used in establishing the connection. An exception handler may also be provided to deal with any error conditions which may occur.

27 Claims, 9 Drawing Sheets

U.S. PATENT DOCUMENTS

| | | | |
|---|---|---|---|
| 6,229,888 B1 * | 5/2001 | Miloslavsky | 379/265.01 |
| 6,292,657 B1 * | 9/2001 | Laursen et al. | 455/411 |
| 6,292,672 B1 * | 9/2001 | Chavez, Jr. | 455/519 |
| 6,320,954 B1 | 11/2001 | Wille | 379/225 |
| 6,324,274 B1 * | 11/2001 | Akester et al. | 379/201.02 |
| 6,363,411 B1 * | 3/2002 | Dugan et al. | 709/202 |
| 6,373,836 B1 * | 4/2002 | Deryugin et al. | 370/352 |
| 6,430,283 B1 * | 8/2002 | Wille | 379/225 |
| 6,507,580 B1 * | 1/2003 | Hokari et al. | 370/360 |
| 6,650,748 B1 * | 11/2003 | Edwards et al. | 379/266.04 |
| 6,816,589 B2 * | 11/2004 | Pinard | 379/265.01 |
| 2001/0043696 A1 * | 11/2001 | Pinard | 379/265.01 |
| 2001/0053219 A1 | 12/2001 | Krank et al. | 379/265.02 |

FOREIGN PATENT DOCUMENTS

| | | |
|---|---|---|
| DE | 196 23 332 A1 | 12/1997 |
| EP | 0 549 126 | 6/1993 |
| EP | 0 549 126 A2 | 6/1993 |
| WO | WO 98 15104 | 4/1998 |
| WO | WO 98/15104 | 4/1998 |

* cited by examiner

NETWORK GROUP PICKUP

BACKGROUND OF THE INVENTION

1. Field of the Invention

The present invention generally relates to a call group pickup system and, more particularly, to a call group pickup system for enabling inter call-group call pickup in a multi-server communication network which allows either manual or automatic call pickup of any call to a group member by any group member station connected to any server in the network.

2. Description of the Prior Art

It is well known that modern telephone systems are able to provide a wide variety of convenience features or supplementary services to enhance calling convenience and functionality. In particular, group pickup is a supplementary service often used by one member station of a group to answer or pick up telephone calls intended for or ringing at a different member station within the same call group. Such a service may be useful, for instance, where the intended call recipient has stepped away from the telephone or is generally not available to pick up the call, yet the call must still be answered. As such, any other member of the call group is able to pick up the call. Group call pickup is accomplished, generally, by dialing an access code or depressing a pickup/line key.

In known private/public telecommunications network/exchange (PTN/PTNX)-based networks and client-server based distributed telecommunications networks, telecommunications devices or stations connected to PTN/servers are interconnected by high speed and/or high bandwidth networks. Unfortunately, only vendor proprietary operation of local group pickup exists, wherein such group pickup is implemented only locally within one PTN/server. Thus, calls may not be picked up by group member stations that are connected to different servers in the network.

Furthermore, known group pickup systems also are unable to notify other available group members that a call group member's station is ringing. Typically, a group member uses a station to pick up a call only when the group member hears another group member station signaling (i.e. telephone ringing). However, in a noisy office environment or when a station has a turned down ringer, the group member may not know that another group member's station may be signaling. Furthermore, if group members are located remote from each other, such as in different offices or cities, hearing a device signaling is impossible.

Therefore, what is needed is a system for enabling notification to be sent to a group member station that a call is available for pick up and further for enabling a group member station to pick up calls from other group member stations from anywhere within a multiserver network, regardless of which server the station initiating the call is connected.

SUMMARY OF THE INVENTION

Briefly, the present invention relates to a system and apparatus for enabling supplementary service functions, such as group pickup, to be implemented in a communication network having more than one server. The multi-server group pickup system is adapted to enable automatic or manual group call pick up from anywhere within the network, including calls to group member stations located on a different server within the multi-server network. The multi-server group pickup system includes an automatic mode unit that automatically searches for a group member that may be available to pick up a call and a manual mode unit that enables a group member, who hears a station ringing, to manually pick up a call. The system further includes a local connect unit and a remote connect unit to establish local or remote connections, respectively, to various group member stations within the network. A remote search unit requests the system to perform a remote search. A queue/dequeue unit selects a group member, that may be available to pick up a call, from a group list in a database. A call establishing unit establishes a connection between the calling station and the call pickup station and an answer unit completes the connection. A release links unit releases any temporary links used in establishing the connection. Optionally, a notification unit may notify the system of the completed connection and an exception handler may deal with any error conditions that occur during the call pickup.

BRIEF DESCRIPTION OF THE DRAWING

Other features, objects and advantages of the present invention will become will become readily apparent and understood upon consideration of the following detailed description and attached drawings, wherein.

DETAILED DESCRIPTION OF THE INVENTION

The present invention relates to a system for enabling supplementary telecommunications service functions, and in particular, group pickup, in a communication network having a plurality of interconnected servers which enables calls that may be ringing, parked, held or camped-on on any group member's station to be picked up by another group member's station anywhere on the network, including by group member stations located on a different server than the ringing station. Call pickup in manual mode is initiated by a group member, upon hearing a ringing station, simply by dialing an access code or depressing a pickup line/key on the answering station. In automatic mode, call pickup is automatically initiated such that the calling station call is automatically sent to an available group member station.

An important aspect of the invention is the group pickup system is dependent only on the network architecture and operational environment of the implementor and is application programming interface (API) and operating system (OS) independent. As will be appreciated by those of ordinary skill in the art, the principles of the present invention are also applicable to a wide variety of different network implementations, and may be used as a feature in any known communications server, including voice services which may span a public network, a private network and interwork between public and private networks, including standard networks such as International Standards Organization (ISO)/European Association for Standardizing Information and Communications Services (ECMA)/European Telecommunications Standards Institute (ETSI) Unified International Corporate Network Signaling Standard (QSIG) compliant ISDN networks in a CSTA/CTI network via applications programming interfaces (API) such as Telephony Application Programming Interface (TAPI) and/or Telephony Services Application Programming Interface (TSAPI) or, as mentioned above, a combination of both ISDN and CSTA/CTI networks. The invention may also be used as a service in a client/server platform using, for example, asynchronous transfer mode (ATM) or local area network (LAN) technologies. Another advantage of the call pickup system is the ability to detect and handle network failures to prevent calls from being lost during pickup.

Figure 2:
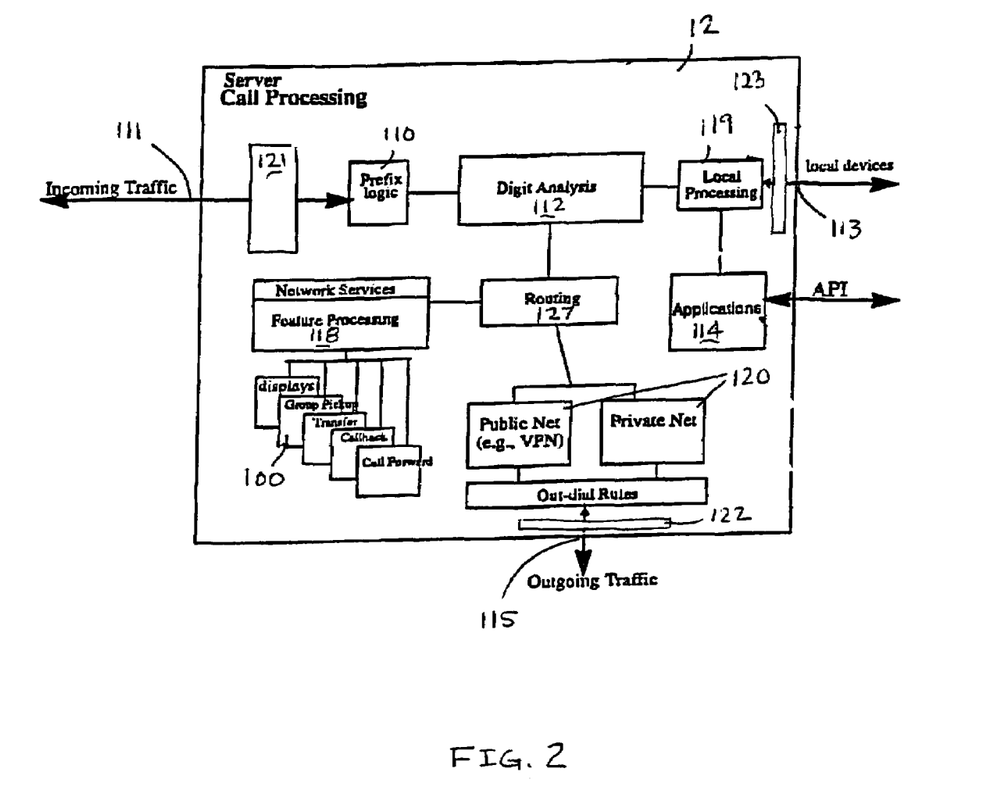
FIG. 2 is a block diagram of a telecommunications server embodying the multi-server group pickup service in accordance with the present invention.
Figure 3:
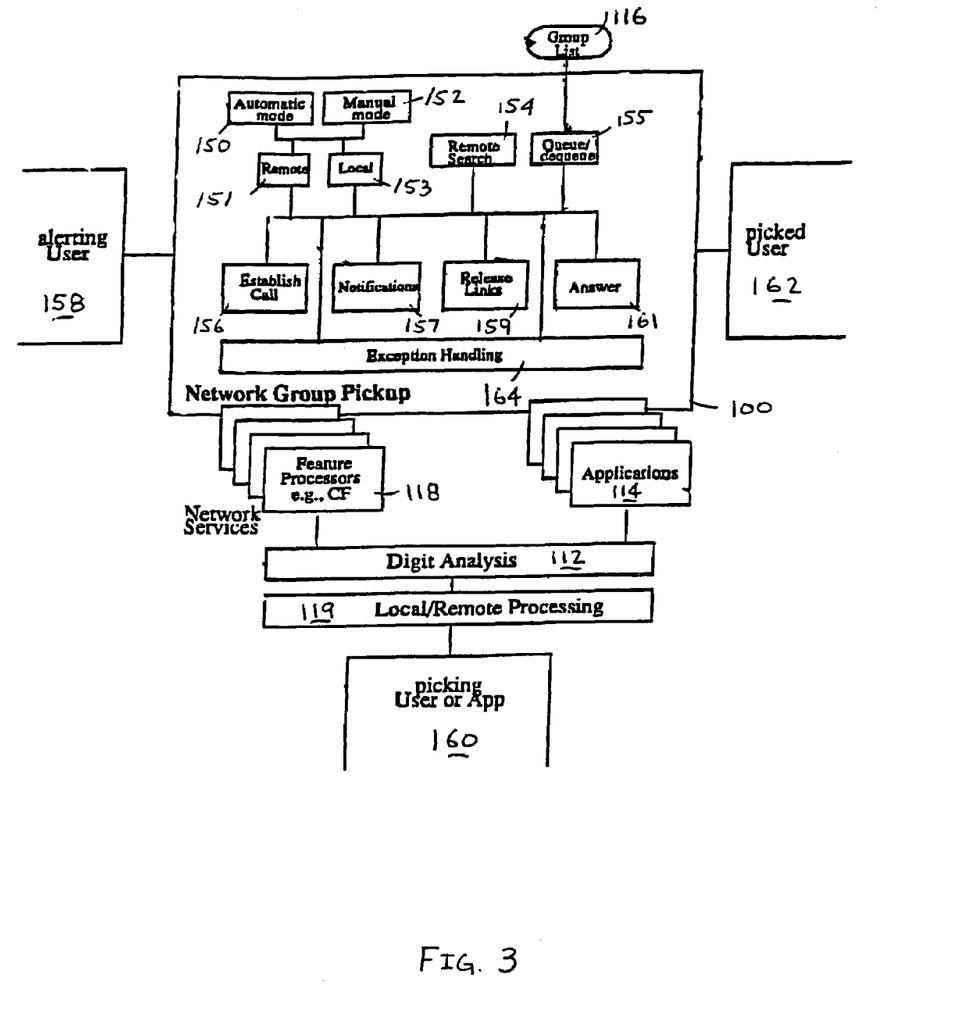
FIG. 3 is a detailed block diagram of the multi-server group pickup service in accordance with the present invention.
Figure 4:
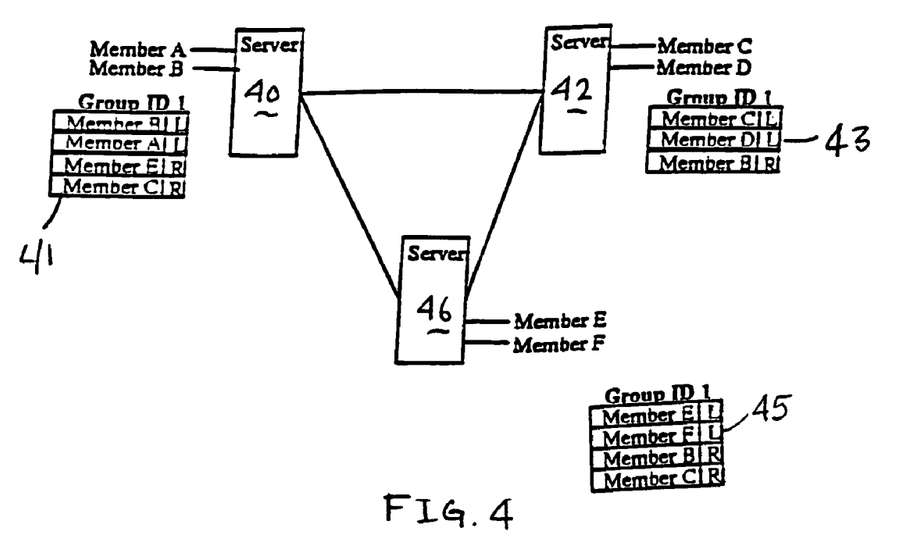
FIG. 4 is a block diagram of an embodiment of the invention configured as a simple multi-server group pickup structure in a distributed environment.
Figure 5:
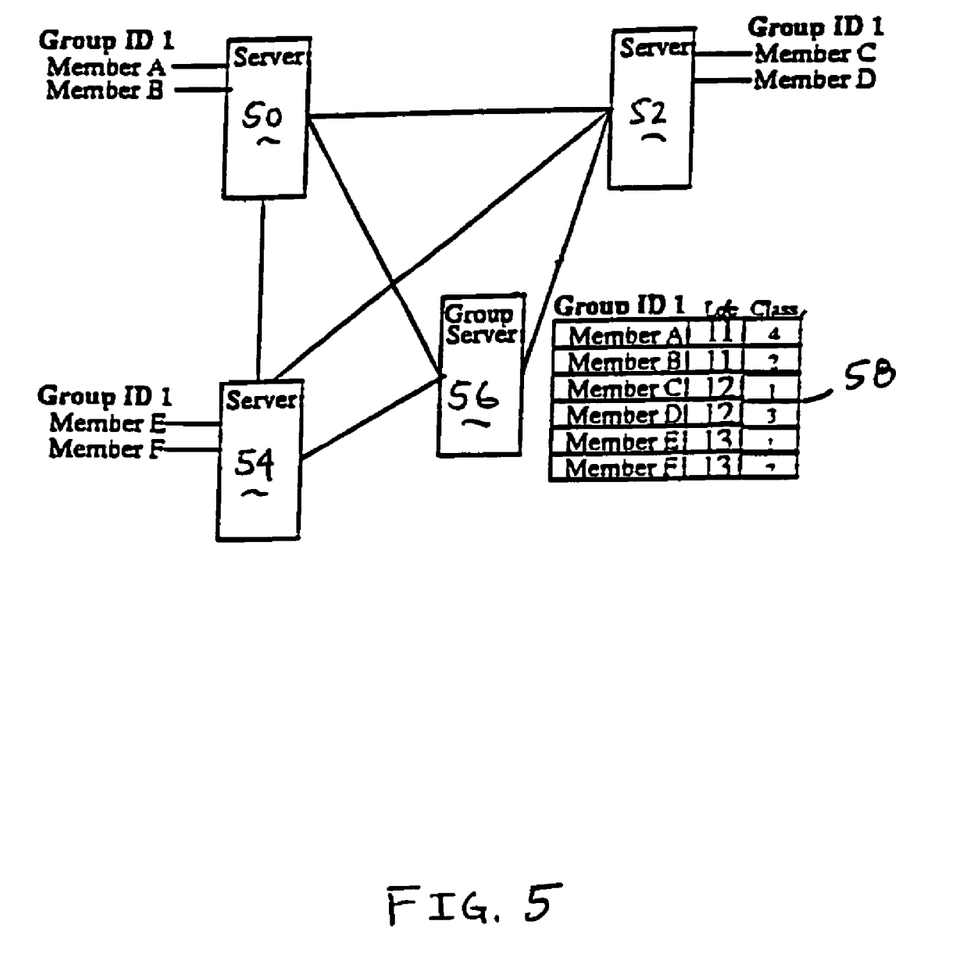
FIG. 5 is a block diagram of another embodiment of the invention configured as a centralized group pickup structure in a group server architecture.
Figure 6:
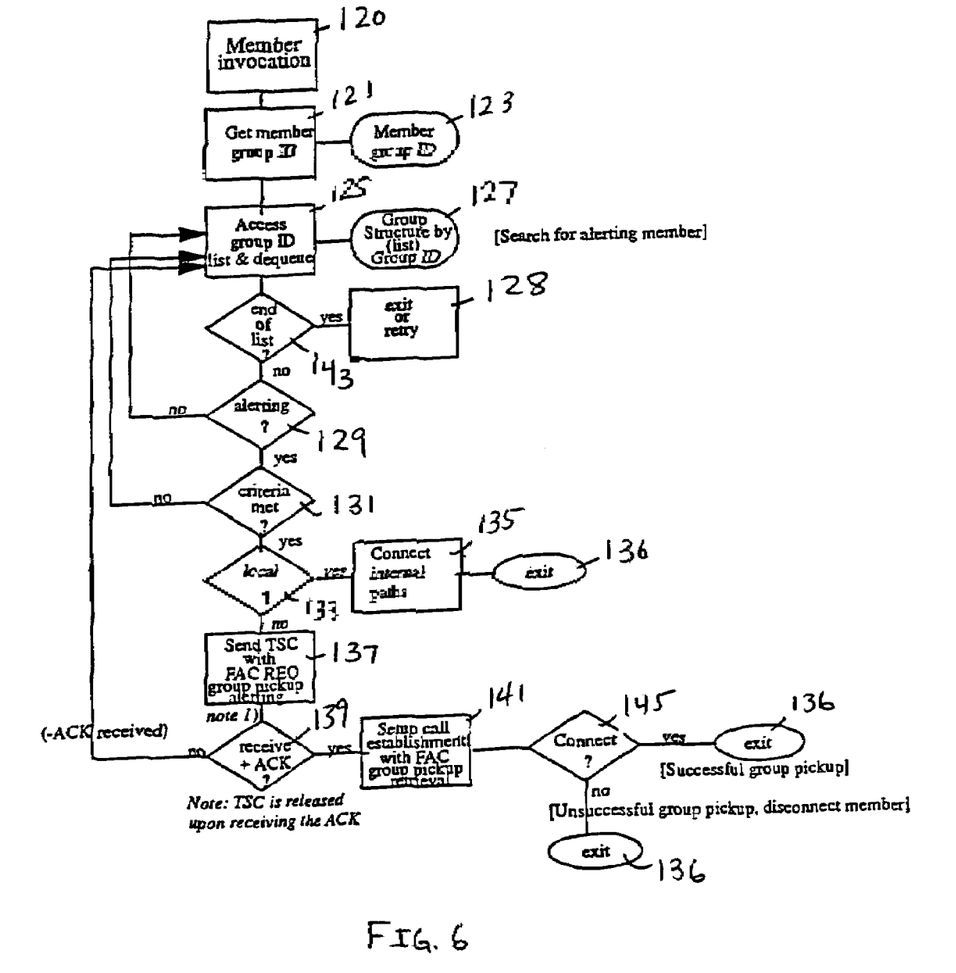
FIG. 6 is a flow diagram of an embodiment of the multi-server group pickup system in operation illustrating a manual mode of operation in accordance with the present invention.
Figure 7:
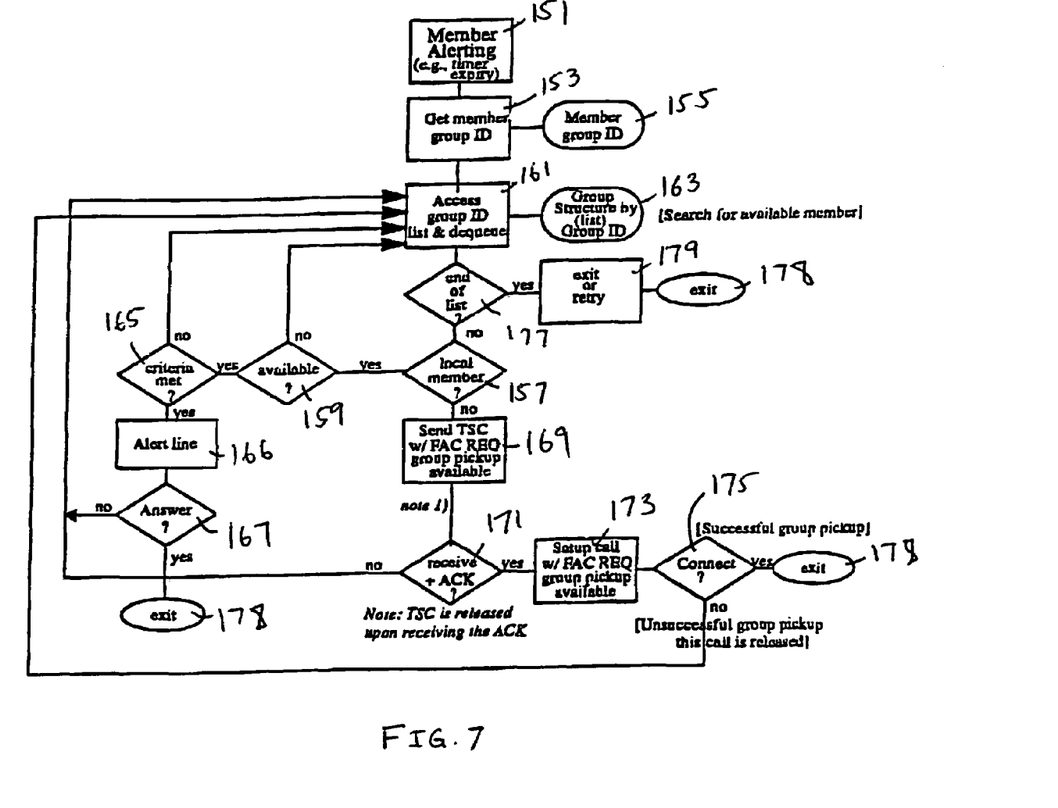
FIG. 7 is a flow diagram of another embodiment of the multi-server group pickup system in operation in automatic mode in accordance with the present invention.

Different embodiments of the invention are described. FIGS. 2 and 3 illustrate the system in an exemplary integrated services digital network (ISDN) architecture. As illustrated in FIG. 4, in a first embodiment, the group pickup service in accordance with the present invention may be used in a distributed server architecture. In another embodiment, as illustrated in FIG. 5, the present invention may be used in a group server architecture. In any embodiment of the invention, the group pickup service may be invoked manually or automatically, as shown in FIGS. 6 and 7, respectively.

Figure 1:
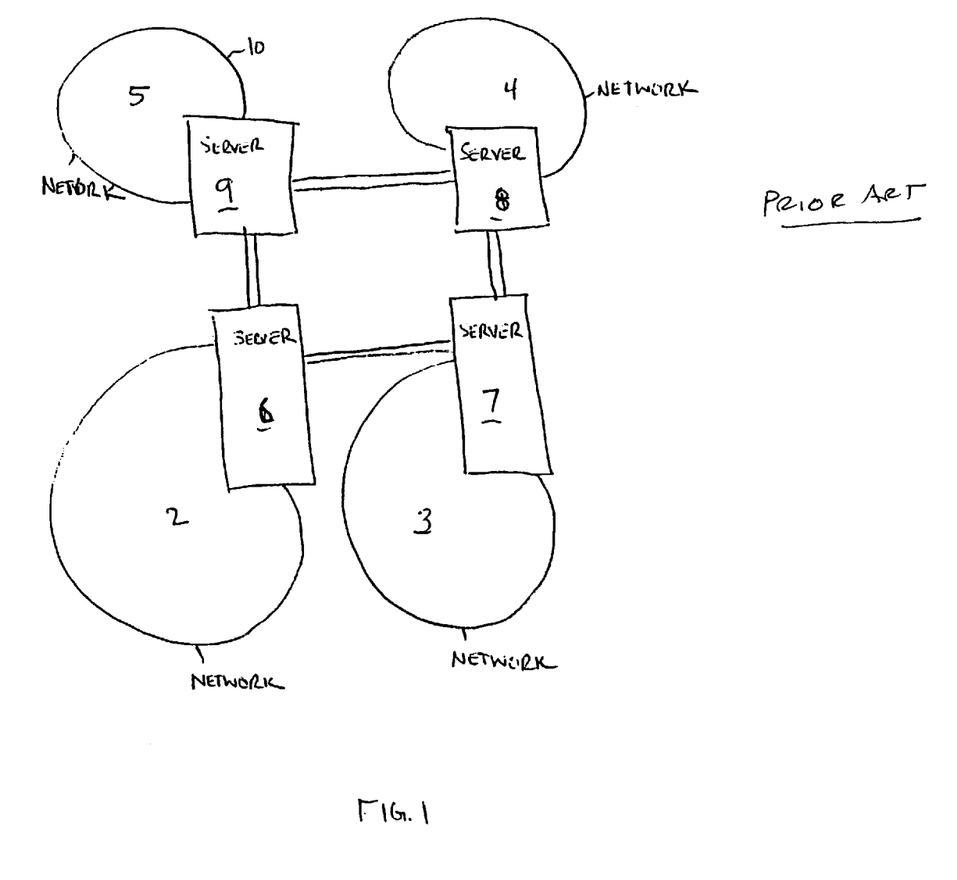
FIG. 1 is a block diagram of a known interconnected telecommunications network.

For a better understanding of the invention, FIG. 1 illustrates a known interconnected network system wherein the network includes several interconnected local servers 6, 7, 8, 9 serving local networks 2, 3, 4, 5 respectively. Typically, each local server 6, 7, 8, 9 only controls those supplementary service functions that are local to the network 2, 3, 4, 5 it serves. Local servers have heretofore been unknown to control supplementary service functions of another remotely located local server. Therefore, the present invention provides special functionality to enable local servers to initiate supplementary service functions for execution on remotely located servers.

Referring to FIG. 2, an exemplary embodiment of a network multi-server group pickup service in accordance with the present invention for an ISDN architecture, generally identified with the reference 100, is illustrated. More particularly, the multi-server group call pickup service 100 is shown, for example, on a communications server 12 as a particular supplementary service in a typical network resources feature processing module 118. The feature processing module 118 handles a number of other supplementary services as well. The communications server 12, which may be any known communications server, such as discussed in U.S. Pat. No. 5,247,670, hereby incorporated by reference, includes standard internal components, such as prefix logic 110 and digit analysis 112 for receiving, decoding and recording telephone number information; applications logic 114, such as CTI, which are described in detail below; and a routing unit 127 for routing a completed call to its proper destination.

An applications programming interface (API) 117 may be used to connect CTI devices to the server 12. The outgoing traffic may be routed, among the other methods, over ATM or intra/internet communications network. The feature processing module 118, as mentioned above, handles a number of different supplementary services including, in particular, the group call pickup service of the present invention. Also included is a local processing unit 119 that handles group call pickup services within the local server 12, as done in currently known systems.

External interfaces to the server may include an incoming trunk 111, such as a primary rate interface (PRI) or internet line, incoming local traffic 113 such as a basic rate interface (BRI) and outgoing traffic 115, such as interfaces for PRI, virtual public and private networks (VPN), etc. BRI service, because of the inherent bandwidth limitations imposed by existing copper telephone lines, is typically used for local traffic. PRI, on the other hand, is intended primarily for users requiring greater bandwidth capacity and is generally used for incoming and outgoing trunk traffic where large amounts of data are carried. Typically, fiber optic lines, for example, are required to handle the extremely large bandwidth of PRI spans.

The incoming lines, such as the BRI 113 and PRI 111 interface to device/trunk handlers 121, 122, 123. The trunk handlers 121, 122, 123 interface the server 12 with the BRI and/PRI external interface 111, 113, 115 which contain the signaling channels. In particular, the handlers 121, 122, 123 operate as a translation device and are able to support various protocol types. This is accomplished through either a standard or proprietary message interface between the handlers 121, 122, 123 and PR and BR interface 111, 113 and 115.

As referred to herein, BRI and PRI may be used interchangeable since the invention generally operates by using the D channel and the associated protocol to receive and transmit messages between communication servers. Preferably, only D channels are used for all signaling and inter-server communications messages. D channel signaling protocols, known as ISDN User-Network Interface, are specified by the International Telecommunications Union (ITU) Q.930/931 specification. Although some form of signaling data may also be carried by the B channels, by using only the D channels for signaling, the B channels generally remain free to carry communications data.

Referring to FIG. 3, the group call pickup service 100 is shown in greater detail. As mentioned above, the group pickup service 100 is responsible for enabling incoming calls to a group member to be picked up by another group member in another server. In particular, the group member may answer or pickup any ringing station, manually held line, camped-on or parked call of another group member anywhere on the network, by auto-dialing/dialing an access code, invoking/pressing a key of a ringing group member or by answering an automatic process that searches for an idle group member call. It should be noted in the present invention, the group member station picking up the call may be within the network but outside of the local server. Accordingly, a call may also be picked up by any authorized group member located anywhere in the network, such that the group member that are located within the same server.

A group pickup service 100 includes an automatic mode unit 150 for enabling the system to automatically search a group list 116, which may be a database stored on one or more servers, to find a group member to take a call. A manual mode unit 152 searches for an alerting group member station that has a call ringing, manually held, camped-on or parked-to and which has an associated guard timer that has expired (not shown). The system further includes a local connect unit 153 and a remote connect unit 151 to establish local or remote connections to a group member, respectively. A remote search unit 154 request a remote search. A queue/dequeue unit 155 selects a group member from the group list 116. The group list 116 may be arranged such that local members are first in the list or in a separate list from the remote members. Several methods are available for searching and selecting between local and remote alerting group members, as described below. A call establishing unit 156 establishes a connection between the calling station and the group member pickup station and an answer unit 155 completes the connection. An optional notification unit 157 may be provided to notify the system of the completed connection. A release links unit 159 may also optionally be provided to release any temporary links used in establishing the connection. An exception handler 164, also optional, may be provided to deal with any error conditions which may occur during group pickup.

Referring to FIG. 4, the present system is shown implemented in a distributed server architecture. Such a system provides for group pickup service components to be resident in every server 40, 42, 46 which has members of one or more pickup groups. Each server micro-controls pickup functions for its resident group members and responds to group pickup requests and status notification from other servers. As shown, a simple group pickup structure is provided in a distributed environment wherein group pickup services are distributed across the network. In particular, non-symmetrical group structure is illustrated in each server. For example, the tables 41, 43, 45 illustrate group structure for Group ID=1, wherein all differ in length and content. By way of illustration, referring to the table 41, the letter "L" indicates that the member is local to the server 40, whereas the letter "R" indicates that the member is remote from the server 40. The method of determining and recognizing local or remote members is implementation dependant and not discussed further. Furthermore, an unlimited number of group IDs may exist, limited only by system resources.

Referring to FIG. 5, the present system is shown implemented in a group server architecture. Such a system provides for group pickup service components to be resident at a group server 56 only. Group members may still be distributed across the network as members of one or more particular remote servers 50, 52, 54 but member/group data and pickup service control are located at the group server 56.

A fundamental difference from the distributed architecture, as described above, is that the status of the groups and group member stations is known by the group server 56 which is the control point for group services such as group pickup. This requires an ongoing update of group members' status and interrogation of group member status. Furthermore, the group server 56 issues commands to the appropriate server, provides authorization checks and makes decisions as pertains to the group call pickup service. The group server 56 may signal the remote servers 50, 52, 54 using a high speed backbone network that is separate from the bearer service network that serves the actual call. As shown, a centralized group pickup structure is illustrated wherein only one group pickup structure, i.e. a table 58, with an associated member profile criteria wherein Loc=server ID and class ID=n is located at the group server 56. It should be noted that other static data may be included as needed.

As mentioned above, the system provides the automatic mode unit 150 and the manual mode unit 152 to enable an automatic or manual mode of operation. In a manual mode of operation, the user at a group pickup station chooses to pick up a call, for example, by auto-dialing/dialing an access code or invoking/pressing a key. The number of the group member where a call is located generally does not need to be dialed. The call pickup station is then connected to the party that is ringing, camped-on, held or parked at a group member that may be located anywhere in the network.

Referring to FIG. 6, manual mode operation may be performed upon invocation by a group member. A group member station may be notified, as described further below, of another member's status through flashing light emitting diodes (LED) or a display, or by other means (e.g. thinks or knows a group member is alerting such as hearing a group member's device ringing). The group member may then determine whether to perform group pickup. Upon invocation of the group pickup function, the server of the group pickup station attempts to find an alerting member.

In operation, in step 120 the group member manually invokes the group call pickup feature through a group member station. In step 121 the server looks up the invoking group member station ID in, for example, the database 116, and in step 125 accesses that Group ID group list. In step 143, the system determines whether the end of the group ID list has been reached. If so, then in step 128 the system attempts a retry or exits. If, however, the end of the list has not been reached, then in step 129 it is determined whether a local member is alerting. If no local member is alerting, the system returns to step 125 wherein the queue/dequeue unit 155 (FIG. 3) provides the next local group member ID on the list. If the group member station criteria is acceptable in step 131, then the system determines whether the group member station is local in step 133. If criteria was not met in step 131, then the system returns to step 125 for the next ID on the list. If the group member station is local, then in step 135 a local internal connection is established to that group member station and the paths are connected between both group member stations. The system then exits in step 136.

If no local group member was alerting in step 133, and it is not known which remote group member station in particular is alerting, then in step 137 the next predefined remote group member station in the group list is searched by sending a non-call-related temporary signaling connection (TSC) to that group member station with a facility request of "group pickup alerting" and group ID of the group member station picking up the call. During this time, the receiving server makes a determination (not shown) of whether one of its local group member stations of this group ID are alerting. As mentioned above, the group list 116 may be two separate lists consisting of local and remote group member stations or a single list wherein the local and remote group member station IDs are separated. In either case, a sequential search or an indexed search method may be used to select group member stations from the appropriate group list 116. For example, each time a remote group member station is tried and fails, the index may be incremented by one to try the next remote group member station. Upon exhausting all remote group member stations, it is an implementation option to retry or terminate the search.

If it is determined that an alerting group member station of this group ID exists, positive acknowledgment (+ACK) is returned to the requestor with that alerting group member station address in step 139 and the TSC is released. If, however, no group member station of the remote server is alerting for this group, negative acknowledgment (−ACK) is returned and the TSC is released. The system returns to step 125 and processing continues with the next remote group member station in the group list. The above procedure repeats until either a +ACK is returned or all defined group member stations in the local group pickup list have been exhausted in step 143. In the event of a failure, the call pickup party is notified. Upon receipt of the +ACK in step 139, the server of the call pickup party establishes a new call to the alerting member and waits for a response in step 141. If the call is accepted by the remote server, e.g. with connect, in step 145, the pickup is successful and the system exits in step 136. However, if the call was not accepted, the pickup is unsuccessful and the call pickup user is notified and the system exits in step 136.

Alternatively, the group member station server at which the call is held, busy, ringing, camped-on or parked may establish the new call-related connection to the call pickup party after returning the +ACK. However, there is no guarantee that this connection will be successful and therefore leaves a window of time that the call could successfully have been answered by some other member. Upon the ringing/busy server receiving a call-related incoming call with facility request "group call pickup alerting" and group ID for the group of the alerting user, the call may be awarded, if the group still has an alerting group member station. The speech paths are then connected together. If more than one member station in this group is alerting, it is implementation-dependent as to which user station should be connected to the call pickup party station.

Referring to FIG. 7, in an automatic mode of operation, unlike in the manual mode, the call pickup station does not invoke group pickup. Rather, the group member stations are interrogated automatically when a group member station is alerting. For example, a process (in the ringing/busy server or alternatively a centralized server) determines a group call pickup is necessary (e.g., a trigger such as a no answer timer may have expired). As can be seen, the automatic mode actively searches for group member stations that may be available to take a call, rather than looking for alerting group member stations.

In operation, in step 153 the automatic process looks up the alerting group member station group ID in a list in the database 116 (FIG. 3) and in step 161 accesses that Group ID group list. In step 177, the system determines whether the end of the group ID list has been reached. If so, then in step 179 the system attempts a retry or exits in step 178. If the end of the list has not been reached, then in step 157 a local group member station is requested to answer the call. If a local group member station is not available in step 159, then the system returns to step 161 and another group member station is dequeued from the list and the search continues in step 177. If a local group member station is available, then in step 165 the system performs criteria checks to determine whether the group member station is acceptable to pick up the call. If the criteria is acceptable, the group member station is notified (e.g., an appropriate line key is flashed) and alerted in step 166. If a local group member station answers in step 167, the internal paths of both members are connected and the process ends in step 178. Otherwise, if there is no answer, processing continues to step 161.

If it is determined in step 157 that no local group member stations are available to answer/pickup the call, the next (or first) remote group member station is attempted. In step 169, a TSC with a facility request for group pickup "available" is sent to the remote server. If, during the remote search, a local group member station becomes available at the alerting member's server, this local idle member may be awarded the call. The TSC is then released. If a −ACK is returned in step 171, the search continues with the next remote member station in the group structure in step 161. If a +ACK is returned with the address of the remote member available in step 171, a new call with bearer service is established in step 173 to the address returned in the +ACK. If the call is successfully connected in step 175, the call paths between the remote group member station and the local group member station are joined and the process exits in step 178. Otherwise, if not successfully connected in step 175 (e.g., network congestion, user busy), the search may continue in step 161 until successful group pickup is achieved or the end of the group list is reached in step 177.

If at any time during the entire above described process a manual group call pickup for this group ID arrives (either remote or local), or an incoming directed call pickup arrives with the alerting member's station address or the ringing/busy station answers, the connection is immediately awarded to the call pickup party and the group search for a call pickup party is terminated for this call by clearing the TSC.

As described above, the group list search type is a single threaded process. However, in both automatic and manual modes, the system may instead initiate a multi-thread request to poll/request all remote group member stations for alerting or available group member stations at approximately the same time, by broadcast rather than the single threaded process as described above. With such an approach, the requesting server sends facility request to each remote server immediately without waiting for a return response. The requesting server may receive many +ACKs to pick up the call, although only one is needed. In such an instance, the requesting server awards the call to one group member station and establishes the bearer channel connection between the party to be picked up and the picking party. All other TSCs are released.

As discussed above, an appropriate group member station must be selected and also meet required criteria before being allowed to pickup a call. The selection and criteria process applies to both automatic and manual modes of operation. Generally, group member stations and a group ID are preassigned by a network administrator. In addition, the administration of the groups and group member stations may be controlled by the system administrator as needed. For example, the number of groups and identification of groups may be may be restricted, the number of group members within a group may be limited, the number of groups of which a user may be a member may also be limited, group pickup criteria (e.g., user profiles, priority, time zone, shift) may also be used to limit selection. Other aspects may be controlled as well.

A predetermined maximum number of local and remote members per Group ID may differ between servers. Groups may be non-symmetrical in that a particular group ID's members in one server do not need to match the same group ID members in another server. Generally, in a first pickup method, only one server ID (i.e., a server ID used for routing to that server which also has members of this same group ID) needs to be pre-defined for each remote server for multiple member searches. When a group ID is specified in the request (i.e., facility request), it represents all resident group members of the same group ID in a remote server. Alternatively, remote members may represent only the one specified member for single member search and the other group members at that remote server will not be interrogated. This is controlled by including the member address rather than group ID in the facility request. Although both types of pickup may coexist, they must be differentiated. Such differentiation may be indicated by the value of each particular entry in the group ID table list (FIG. 4, 5). In particular, the Group ID table list may include arguments such as group ID number for specifying the particular group to which a group member station belongs, group member station address, local/remote server information for specifying the whether the group member station is remote or local to a particular server, server ID for identifying a particular server, member profile index and search type for specifying single or multi thread search of the group member station list. It should be noted that the system administrator may determine the contents of the table list and that not all arguments may be present in all ID table lists.

The group internal structures may also be determined by a system administrator. For example, the group internal structures may use first-in/first-out (FIFO) processing and/or selection of members within a group by certain criteria e.g., priority or class, location in network (e.g., server ID) shift/time (e.g., as compared to the time of call), type of caller (e.g., external, internal) or any other type of selection criteria. For example, local group member stations may be specified first in a group and remote group member stations last in order to speed processing. Generally, the server of the ringing/busy party, regardless of mode of operation, may award the pickup to any group member station it chooses. Typically, the connection is awarded on a first-come basis, although local members are generally preferable to remote members because of the reduced network traffic incurred.

Optionally, group members may be notified of another group member's status via a non-call related TSC or other means (e.g., LAN). This may be necessary when manual pickup is used, due to the nature of depending on other group member stations knowing about an alerting group member station since they must voluntarily invoke the group pickup service. Notification generally involves the server's constant monitoring of each resident group member station in order to update other group member stations (e.g., group member idle state). The information (or a subset of the information) received is then available to each group member station via interrogation and/or prompt e.g., application screen pop, display, flashing LED, in-band announcement/tones.

The information to be sent or derived (or a subset thereof) for status update is sent whenever the status of a group member station changes and can include, when applicable, but is not limited to member status (e.g., busy, idle, alerting), group identity, member network address (of alerting member), name, position (e.g., capabilities), caller disposition (e.g., on-hold, camped-on) and caller info (e.g., SID/ANI, name, account number).

The receiving server may use the information as required, e.g., provide optional notification to those associated group member stations. The member status update (e.g., via Facility IE and/or User-User IE) can include, but is not limited to, alerting state, busy state, and idle state. Notification is applicable for all modes of operation and may occur at any time.

As mentioned above, in either an automatic or manual mode of operation and in the situation where a local member is not available, a search may be initiated to find a remote group member station that may be alerting (manual mode) or available (automatic mode), depending on the requested facility. Generally, two types of searches are possible. First, only a single group member station may be searched. The facility request (either alerting or available) specifies one particular member address only. Only that group member station will be interrogated to determine whether a +ACK or a −ACK is returned. No other group member station is interrogated.

Second, multiple group member stations may be searched. The facility request (either automatic or manual) specifies a group ID but not a member address. As such, all resident group member stations of that group ID will be interrogated. At the first alerting/available group member station, a +ACK is returned. If none of the resident group member stations of that group ID are alerting/available, a −ACK is returned. In the case of a facility request/alerting, the receiving server searches for a group member station that is ringing unanswered. In the case of a facility request/available, the receiving server searches for an idle member, alerts that member and waits for an answer or no answer.

Figure 8:
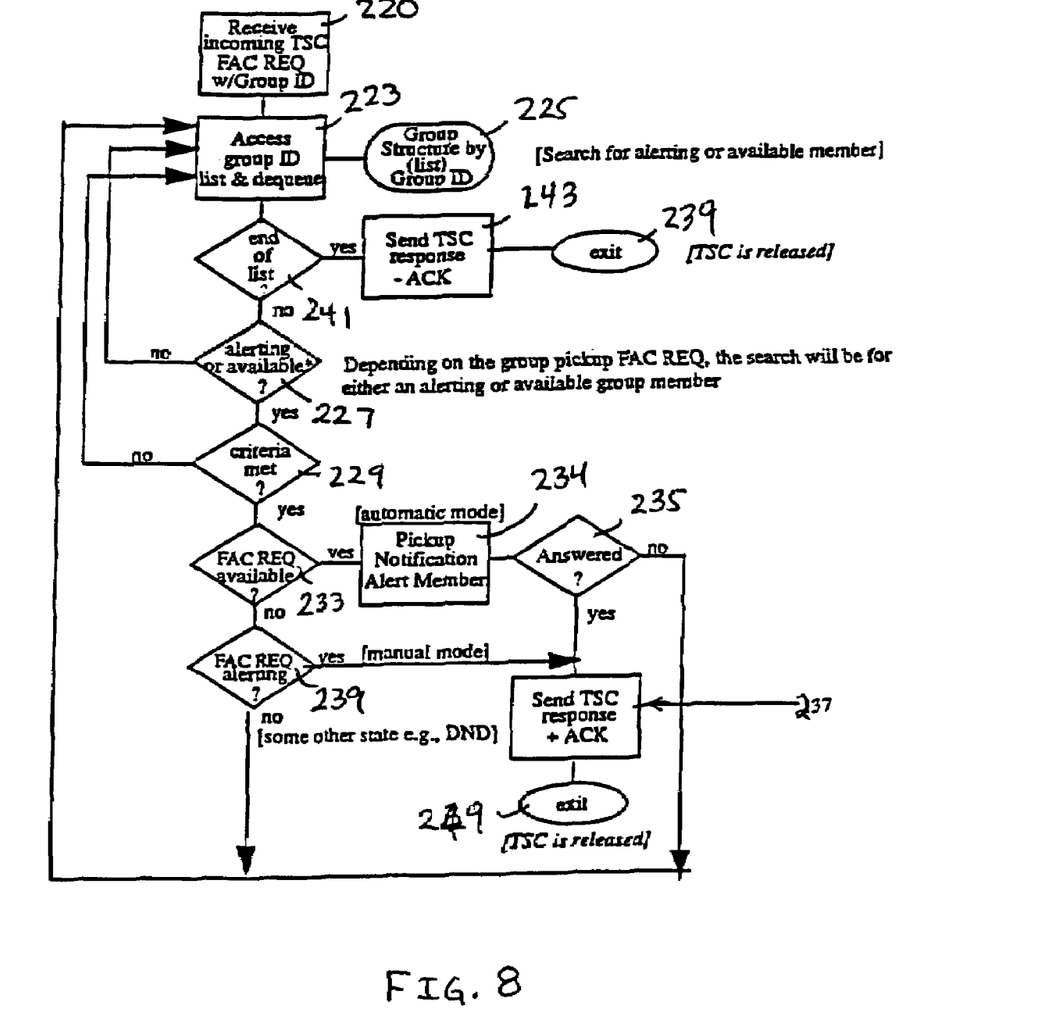
FIG. 8 is a flow diagram of the group search logic in a remote member's server in accordance with the present invention.

Referring to FIG. 8, in operation, in step 220 the system will receive an incoming non-call related TSC request with group ID, and an optional correlation number which may be used to associate the incoming call to the alerting/available group member station. In step 223 the server accesses and looks up the invoking group member station ID in the database 116. In step 241, the system determines whether the end of the group ID list has been reached without finding an available or alerting group member station. If so, then in step 243 the system sends a −ACK to the requestor. The system may then exit in step 249 and release the TSC. If, however, the end of the list has not been reached, then in step 227 it is determined whether a group member station is alerting or available (i.e., depending on the facility request). In step 229 it is determined whether this group member station is acceptable. If not, then the system returns to step 223 to search for the next group member station. If the member criteria is deemed acceptable in step 229, then in step 233 it is determined whether the facility request is for group pickup "available". If so, the group member station is alerted and notified, if not already notified, (e.g., via display) of an incoming group pickup in step 234. In step 235, if the member answers within an allotted reasonable predetermined amount of time, the server sends a +ACK to the TSC in step 237. However, if the member station does not answer within the allotted time, then the system returns to step 223 to select the next group member station.

If in step 233 it is determined that the facility request is not for group pickup "available", the system then determines in step 239 whether the facility request is for group pickup/alerting. If so, the system in step 237 responds to the facility request with a +ACK. If the group member station is neither available or alerting, (e.g., do not disturb state, out-of-service state, etc), this group member station is bypassed and the system returns to step 123 to select the next group member station.

It should be noted that in step 237, when a +ACK is received, either the remote or requesting server may provide call establishment in order to connect the two parties. It is recommended to allow the requesting server to perform the call establishment since the requesting server is the control point for this service and may have in the meantime possibly awarded the pickup to some other member. This also reduces the number call initiations which may fail when the remote server establishes the connection to the requestor. Alternatively, when the group member station answers, the TSC may be converted to a B-channel connection, as discussed further below. The call pickup party is then connected to the caller.

Alternatively, for facility request/available, all idle group member stations may be alerted simultaneously. Optional notification of the requested pickup to the available member may be via display, inband tone/announcement and may indicate the connection is a party to be picked up and may also include other information about the party to be picked up (e.g. user information such as calling party name, account number, etc. may be included in the TSC). The first answering group member station will be awarded the call, thereby causing a +ACK to be sent to the requesting server.

As mentioned above, the TSC may be converted to a bearer channel when the group member station answers. In addition, a bearer channel may be established with or without releasing the TSC. The conversion to establish a bearer service call is allowable only when the search for a remote available or alerting group member stations has been found and awarded the pickup. These procedures apply to both manual and automatic modes when a remote group member station is found to be alerting or available.

Figure 9:
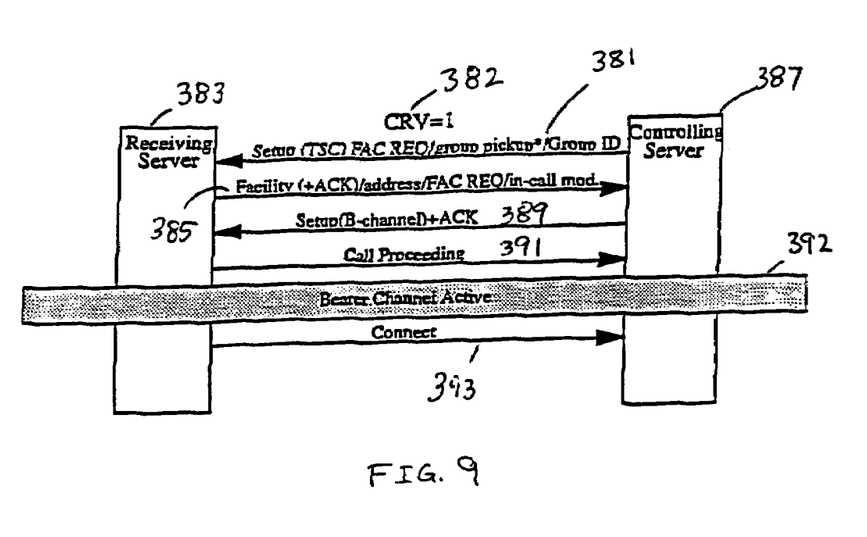
FIG. 9 is a detailed block diagram of the multi-server group pickup system illustrating a bearer channel and a temporary signaling connection in accordance with the present invention.

Referring to FIG. 9, the TSC may be converted by establishing a B-channel that uses the same call reference value (CRV) 382 as the TSC, as shown in the TSC establishment step 181 (FIG. 5). This procedure does not require a correlation number/ID to associate the picked up party and the call pickup group member station, but does require a procedure for in-call conversion to add (e.g., modification of channel ID, bearer capability/low layer compatibility (BC/LLC) for ISDN facilities) bearer service (i.e., possible when an available bearer channel exists). It is recommended the controlling side server 387 of the connection establish the B-channel, as shown in the setup message 389, rather than the receiving side server 383 of the connection.

If the group member station is available and not alerting, that group member station will be notified of the pickup, answered, and be ready to have the send and receive paths connected. If the group member station was alerting, the call is already waiting to be answered and have the send and receive paths connected. It should be noted that the response to the facility request for in-call modification 385, is shown in the setup message 389. If the response to the facility request 385 returns –ACK in a release message, the TSC is cleared. The server 387 on the controlling side of the connection establishes the bearer channel with a SETUP message with bearer service 389 using the same CRV 382 and switches the send and receive paths as soon as the receiving side returns a call proceeding message 391. At this point, the bearer channel 392 is successfully connected.

The server 383 on the receiving side of the connection switches the send and receive paths of it's connection to the new bearer channel and sends a connect message 393 to the server 387 on the controlling side. The call pickup (i.e., available) party is then talking with the caller (i.e., the alerting user). If no bearer channel is awarded because of, for example, network congestion, the TSC is cleared with a release message and cause value and the server controlling the group pickup service (i.e., server of the group member station picking up the call for manual mode and server of alerting group member station for automatic mode) may continue the search for the next remote group member in the group structure (not shown).

Figure 10:
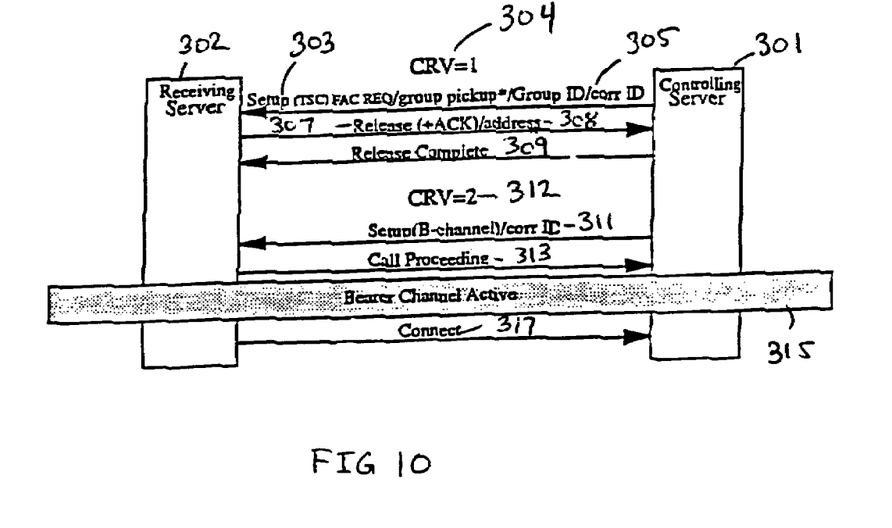
FIG. 10 is a detailed block diagram of the group pickup system bearer channel and releasing a temporary signaling connection in accordance with the present invention.

Referring to FIG. 10, the system is shown wherein the CRV 304 from the TSC is not transferred to the bearer channel, but rather, a new bearer channel is established having a different CRV from that of the TSC. As shown, the server 301 represents the controlling server of the group pickup service. For manual mode, the server of the call pickup group member station, which will search for an alerting member, is the controlling server (not shown). For automatic mode, the server of the alerting group member station, who will search for an available member, is the controlling server (not shown). The TSC facility request message 303 for group pickup is assigned a CRV 382 having a value of 1 and can carry a unique network-wide correlation number or ID 305, in the forward direction of the setup message 303. This correlation ID 305 is stored by the receiving server 302, to later correlate an associated incoming call (with bearer services) if an available or alerting member is found (i.e., depending on whether the group pickup request was manual or automatic mode). If the receiving server 302 finds a group member station meeting the criteria and if the facility request was group pickup "available", the group member station is notified of the pickup and, upon the group member station answering, is notified to wait. This may be done through and announcement, display, or other method. A +ACK message 307 with the answering group member station address 308 is sent to the controlling server 301. The controlling server 301 then releases the TSC 309 and establishes a new B-channel call, with a CRV 312 having a value of 2 to the group member station address 307, including the correlation ID 311.

The receiving server 302 monitors the incoming calls looking for a setup message 311 with group pickup correlation ID 311, matches the ID 311, and sends a call proceeding message 313 to the controlling server 301. At this time, the B-channel is established and the receiving server switches the send and receive paths of it's waiting group member station to the B-channel 315 and sends a connect message 317 to the controlling server 301. Upon the controlling server 301 receiving the call proceeding message, it connects its group member station to the B-channel 315.

Alternatively, the receiving server 302 may perform the new call establishment, rather than the controlling server 301. In such a case, the TSC does not contain the correlation ID, rather, the release message with +ACK includes the correlation ID. The controlling server 301 saves the correlation ID. The receiving server 301 includes the correlation ID in the new call establishment setup message and the controlling user performs the monitoring of incoming calls and matches received correlation ID with the stored correlation ID.

A possible variation of the bearer channel establishing methods, as described above, is to always have the master side, rather than the controlling side, of the connection establish the new call because it may have a better chance of getting an available connection since each server knows whether it is the master or slave side of the connection. The master side "wins" when a glare condition occurs during call setup establishment and, therefore, the master side has a better chance of obtaining a bearer channel during peak load times.

A possible consideration in implementation of the present system is a conservation of links or path replacement, since group pickup typically results in a redirection using new network resources that are not part of the original connection. Both conservation of links and path replacement are specified by standards bodies and are therefore not further discussed herein. Path replacement of bearer channels may not be necessary with group server architecture since the group server dictates the call establishment to the optimal server to establish the call path.

What is claimed is:

1. A group pickup system in a communication network having one or more servers, said group pickup system comprising:

one or more call group locations associated with different ones of said one or more servers, each of said one or more servers including call group lists of members for each call group, said each call group having listed members from said one or more call group locations;

an invite request unit to invoke the group pickup system;

a group pickup request unit responsive to said invite request unit to establish a connection to any of a plurality of group pickup destinations to enable a call to a called station to be picked up from any group pickup destination, said destination being manually and automatically selectable, said destinations being automatically serially selected responsive to one of an alerting listed group member location and manually selected responsive to a responding listed group member location; and a retrieval request unit to connect a selected call pickup station with said call to said called station.

2. The system as recited in claim 1 further including an exception handler adapted to handle failures in the group pickup system.

3. The system as recited in claim 1, wherein said one or more servers is a plurality of servers, ones of said plurality being capable of controlling call service functions on others of said plurality of servers, and wherein a call pickup party may be located on any server within the network and picking up a call at a destination associated with another server in the network.

4. The system as recited in claim 1, wherein each server micro-controls pickup functions for resident group members and responds to group pickup requests and status notification from other ones of said one or more servers.

5. The system as recited in claim 2, wherein said network failure may include excessive network congestion.

6. The system as recited in claim 2, wherein said network failure may include a vacant number.

7. The system as recited in claim 2, wherein said network failure may include no route to destination.

8. The system as recited in claim 1, wherein said invite request unit comprises a manual select unit and an automatic select unit, and manually selecting comprises picking up said call at said destination and automatically serially selecting comprises sequentially contacting listed group members in a listed order for a corresponding group.

9. A method for picking up a call in a group pickup system in a communication network having one or more servers, each of said one or more servers including call group lists of members for each call group, said each call group having listed members from said one or more call group locations, said method comprising:
  invoking the group pickup system;
  establishing a connection to a group pickup destination to enable said call to be parked at said group pickup destination, said group pickup destination being one of said one or more group locations associated with one of said one or more servers;
  serially selecting destinations automatically and manually from a list of said one or more group locations to identify a call pickup destination, said destinations being automatically serially selected destinations responsive to one of an alerting listed group member location and manually selected responsive to a responding listed group member location; and
  connecting said call pickup destination with said parked call, said call pickup destination picking up responsive to control of an associated one of said one or more servers;
  wherein said group pickup system comprises a supplementary service group pickup system.

10. The method as recited in claim 9, further including the step of handling failures in the group pickup system.

11. The method as recited in claim 9, wherein one or more servers is a plurality of servers, at least one said call group having listed members from call group locations associated with each of at least two of said plurality of servers, ones of said plurality of servers being capable of controlling call service functions on others of said plurality of servers, said method further including the step of picking up said parked call from any said at least one call group pickup destination within the network, wherein said call pickup destination may be manually selected from one of said one or more group locations before a location is automatically selected.

12. A group pickup system in a communication network having one or more servers, said group pickup system comprising:
  means for maintaining call group lists of members for a plurality of call groups;
  means for invoking the group pickup system;
  means responsive to said invoking means for establishing a connection to a group pickup destination to enable parking calls at said group pickup destination, said group pickup destination being a first of said one or more group locations associated with one of said one or more servers;
  means for serially selecting destinations automatically and manually from a list of said one or more group locations located anywhere within the network to identify a pickup destination, said destinations being automatically serially selected responsive to one of an alerting listed group member location and manually selected responsive to a responding listed group member location; and
  means for connecting said pickup destination with a parked call;
  wherein said group pickup system comprises a supplementary service group pickup system.

13. The system as recited in claim 12 further including means for handling failures in the group pickup system.

14. The system as recited in claim 12, wherein one or more servers is a plurality of servers, ones of said plurality being capable of controlling call service functions on others of said plurality of servers, said system further including means for picking up calls from anywhere within the network, wherein said pickup destination may be manually selected from one of said one or more group locations before a location is automatically selected.

15. A system for enabling group pickup in a communications network including a plurality of servers, ones of said plurality being capable of controlling call service functions enabling incoming calls to stations associated with any server to be picked up by local stations associated with others of said ones, each of said ones comprising:
  group list storage storing lists of members for a plurality of call groups;
  a request unit to enable operation of the group pickup system when there is an unanswered call at a listed member station, said request unit automatically serially selecting destinations responsive to one of an alerting listed group member location and manually selecting responsive to a responding listed group member location;
  a connect unit responsive to said request unit to make local and/or remote connections to various local and/or remote listed group member stations associated with said ones which may act as call pickup stations or unanswered stations; and
  a call establishing unit for establishing a connection between the calling station and a selected call pickup station, wherein the calling station and selected call pickup station may be associated with different servers and define listed member stations.

16. A system according to claim 15, in which the request unit comprises:
  an automatic mode unit that automatically serially searches for a listed group member local station that may be available to pick up an unanswered call, and selectively designates an identified listed group member local station as said selected call pickup station; and
  a manual mode unit that is initiated by a listed group member who is aware of an unanswered call at another station and searches for an alerting listed group member station, wherein said manual mode unit designates an identified said alerting listed group member station as said selected call pickup station.

17. A system according to claim 16, wherein each of said ones further comprises a remote search unit to search for a listed remote group member that is manually alerting or determined available.

18. A system according to claim 17, wherein the remote search unit sends a temporary signaling connection with a facility request to search all the listed group member stations at a remote location.

19. A system according to claim 15, wherein each of said ones further comprises a queue/dequeue unit for selecting a group member from a database including listed groups.

20. A system according to claim 16, wherein each of said ones further comprises means for assessing whether an available/alerting listed group member station fulfills set criteria before final selection thereof.

21. A system according to claim 15, wherein each of said ones further comprises a release links unit to release any temporary links used in establishing the connection and/or convert them to a bearer service cell.

22. A method of enabling group pickup in a communications network including a plurality of servers, ones of said plurality being capable of controlling call service functions enabling incoming calls to stations associated with any server to be picked up by local stations associated with others of said ones, said method comprising:
  maintaining call group lists of members for a plurality of call groups;
  enabling the group pickup operation when there is an unanswered call at a listed member station anywhere on the network;
  making local and/or remote connections to various local and/or remote listed group member stations which may act as call pickup stations or unanswered stations;
  serially selecting a call pickup local station automatically responsive to one of an alerting listed group member location and manually selecting responsive to a responding listed group member location; and
  establishing a connection between the calling station and a selected call pickup local station, wherein call pickup local stations and unanswered stations are associated with listed members of the same call group and different servers.

23. A method according to claim 22, further including the step of automatically serially searching for a listed group member local station that may be available to pick up an unanswered call.

24. A method according to claim 22, further including the step of searching for an alerting group member local station manually triggered by a listed group member at another station, wherein manually triggering comprises one of dialing an access code from said alerting group member local station and picking up said alerting group member local station.

25. The method as recited in claim 22, further including the step of handling failures in the group pickup system.

26. The method as recited in claim 22, further including the step of picking up a call from anywhere within the network.

27. A telecommunications system comprising:
  a plurality of servers, ones of said plurality being capable of controlling call service functions enabling pickup of incoming calls to stations associated any server by local stations associated with others of said ones;
  a plurality of telephone devices, each associated with one of said plurality of servers; and
  a group pickup system including at least one call group list listing members in a group pickup group comprising a predetermined number of said plurality of telephony devices associated with different ones of said plurality of servers and which allows call pickup of any call to a listed group member by any listed group member station connected to any of said plurality of servers, wherein the pickup station may be automatically serially or manually selected, said pickup station being automatically serially selected responsive to one of an alerting listed group member station and manually selected responsive to a responding listed group member station.

* * * * *